(12) United States Patent
Richards

(10) Patent No.: US 12,155,960 B2
(45) Date of Patent: *Nov. 26, 2024

(54) MULTIPLE STAGE MODULATION PROJECTOR DISPLAY SYSTEMS HAVING EFFICIENT LIGHT UTILIZATION

(71) Applicant: DOLBY LABORATORIES LICENSING CORPORATION, San Francisco, CA (US)

(72) Inventor: Martin J. Richards, Gig Harbor, WA (US)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/589,736

(22) Filed: Jan. 31, 2022

(65) Prior Publication Data

US 2024/0073357 A1    Feb. 29, 2024

Related U.S. Application Data

(63) Continuation of application No. 16/847,147, filed on Apr. 13, 2020, now Pat. No. 11,240,464, which is a
(Continued)

(51) Int. Cl.
*H04N 5/74* (2006.01)
*H04N 9/31* (2006.01)

(52) U.S. Cl.
CPC ........... *H04N 5/7458* (2013.01); *H04N 9/312* (2013.01); *H04N 9/3126* (2013.01);
(Continued)

(58) Field of Classification Search
CPC .... H04N 5/7458; H04N 9/312; H04N 9/3126; H04N 9/3152; H04N 9/3161; H04N 9/3164; H04N 2005/7466
See application file for complete search history.

(56) References Cited

U.S. PATENT DOCUMENTS

| 5,428,417 A | 6/1995 | Lichtenstein |
| 5,504,575 A | 4/1996 | Stafford |

(Continued)

FOREIGN PATENT DOCUMENTS

| CN | 1700085 | 11/2005 |
| CN | 101076705 | 11/2007 |

(Continued)

OTHER PUBLICATIONS

Amako, J. et al "wave-Front Control Using Liquid-Crystal Devices" Applied Optics, vol. 32, Issue 23, pp. 4323-4329, 1993.

(Continued)

*Primary Examiner* — Michael Lee

(57) ABSTRACT

Dual or multi-modulation display systems comprising a first modulator and a second modulator are disclosed. The first modulator may comprise a plurality of analog mirrors (e.g. MEMS array) and the second modulator may comprise a plurality of mirrors (e.g., DMD array). The display system may further comprise a controller that sends control signals to the first and second modulator. The display system may render highlight features within a projected image by affecting a time multiplexing scheme. In one embodiment, the first modulator may be switched on a sub-frame basis such that a desired proportion of the available light may be focused or directed onto the second modulator to form the highlight feature on a sub-frame rendering basis.

20 Claims, 7 Drawing Sheets

Related U.S. Application Data continuation of application No. 15/880,239, filed on Jan. 25, 2018, now Pat. No. 10,623,685, which is a continuation of application No. 15/358,998, filed on Nov. 22, 2016, now Pat. No. 9,918,052, which is a continuation of application No. 14/696,918, filed on Apr. 27, 2015, now Pat. No. 9,531,982, which is a continuation of application No. 14/300,585, filed on Jun. 10, 2014, now Pat. No. 9,049,413.

(60) Provisional application No. 61/860,203, filed on Jul. 30, 2013.

(52) U.S. Cl.
CPC ......... *H04N 9/3152* (2013.01); *H04N 9/3161* (2013.01); *H04N 9/3164* (2013.01); H04N 2005/7466 (2013.01)

(56) References Cited

U.S. PATENT DOCUMENTS

| | | | |
|---|---|---|---|
| 5,986,640 A | 11/1999 | Baldwin | |
| 6,088,321 A | 7/2000 | Yamaji | |
| 6,273,571 B1 | 8/2001 | Sharp | |
| 6,337,760 B1 | 1/2002 | Huibers | |
| 6,373,806 B1 | 4/2002 | Kitamura | |
| 6,535,472 B1 | 3/2003 | Lee | |
| 6,897,999 B1 | 5/2005 | Bass | |
| 7,050,122 B2 | 5/2006 | Gibbon et al. | |
| 7,126,736 B2 | 10/2006 | Itoh | |
| 7,346,234 B2 | 3/2008 | Davis | |
| 7,551,341 B1* | 6/2009 | Ward | G03B 21/005 359/259 |
| 7,812,959 B1 | 10/2010 | Kim | |
| 7,986,603 B1 | 7/2011 | Trisnadi | |
| 8,125,702 B2 | 2/2012 | Ward | |
| 8,199,387 B1 | 6/2012 | Aye | |
| 8,366,275 B2 | 2/2013 | Harding | |
| 8,684,533 B2 | 4/2014 | Whitehead | |
| 8,783,874 B1 | 7/2014 | Riza | |
| 9,049,413 B2* | 6/2015 | Richards | H04N 9/3164 |
| 9,531,982 B2* | 12/2016 | Richards | H04N 9/3152 |
| 9,918,052 B2* | 3/2018 | Richards | H04N 9/3161 |
| 9,983,545 B2 | 5/2018 | Gorny | |
| 10,534,316 B2 | 1/2020 | Gorny | |
| 10,623,685 B2* | 4/2020 | Richards | H04N 9/3126 |
| 10,969,742 B2 | 4/2021 | Gorny | |
| 11,240,464 B2* | 2/2022 | Richards | H04N 9/3164 |
| 2001/0017836 A1 | 8/2001 | Itoh | |
| 2002/0171807 A1 | 11/2002 | Hibi | |
| 2003/0016335 A1 | 1/2003 | Penn | |
| 2004/0001184 A1 | 1/2004 | Gibbon | |
| 2005/0029308 A1 | 2/2005 | Benett | |
| 2005/0169094 A1 | 8/2005 | Itoh | |
| 2005/0190140 A1* | 9/2005 | Asahi | G03B 21/005 345/100 |
| 2005/0259308 A1 | 11/2005 | Itoh | |
| 2005/0286101 A1 | 12/2005 | Garner | |
| 2006/0082692 A1 | 4/2006 | Kamijima | |
| 2006/0092380 A1 | 5/2006 | Salsman | |
| 2006/0164705 A1 | 7/2006 | Itoh | |
| 2007/0058143 A1 | 3/2007 | Penn | |
| 2007/0120786 A1 | 5/2007 | Bells, II | |
| 2007/0146846 A1 | 6/2007 | Yasuda | |
| 2007/0211218 A1 | 9/2007 | Nitta | |
| 2007/0268224 A1 | 11/2007 | Whitehead | |
| 2007/0285587 A1 | 12/2007 | Seetzen | |
| 2008/0024848 A1 | 1/2008 | Kawano | |
| 2008/0043303 A1 | 2/2008 | Whitehead | |
| 2008/0055549 A1 | 3/2008 | Perkins | |
| 2008/0174860 A1 | 7/2008 | Yelleswarapu | |
| 2008/0180465 A1 | 7/2008 | Whitehead | |
| 2008/0185978 A1 | 8/2008 | Jeong | |
| 2008/0186308 A1 | 8/2008 | Suzuki | |
| 2008/0204834 A1 | 8/2008 | Hill | |
| 2008/0231936 A1 | 9/2008 | Endo | |
| 2008/0239419 A1 | 10/2008 | Tachibana | |
| 2008/0246705 A1 | 10/2008 | Russell | |
| 2008/0246783 A1 | 10/2008 | Endo | |
| 2009/0103151 A1 | 4/2009 | Horikawa | |
| 2009/0135314 A1 | 5/2009 | Hui | |
| 2009/0141189 A1 | 6/2009 | Shirai | |
| 2009/0141194 A1 | 6/2009 | Shirai | |
| 2009/0225234 A1 | 9/2009 | Ward | |
| 2009/0244499 A1 | 10/2009 | Bartlett | |
| 2009/0278918 A1 | 11/2009 | Marcus | |
| 2009/0284671 A1 | 11/2009 | Leister | |
| 2010/0014134 A1 | 1/2010 | Cable | |
| 2010/0039918 A1 | 2/2010 | Tanaka | |
| 2010/0046050 A1 | 2/2010 | Kroll | |
| 2010/0103246 A1 | 4/2010 | Schwerdtner | |
| 2010/0118360 A1 | 5/2010 | Leister | |
| 2010/0149139 A1 | 6/2010 | Kroll | |
| 2010/0149311 A1 | 6/2010 | Kroll | |
| 2010/0157399 A1 | 6/2010 | Kroll | |
| 2010/0165429 A1 | 7/2010 | Buckley | |
| 2010/0214282 A1 | 8/2010 | Whitehead | |
| 2010/0253677 A1 | 10/2010 | Kroll | |
| 2011/0227900 A1 | 9/2011 | Wallener | |
| 2011/0251905 A1 | 10/2011 | Lawrence | |
| 2011/0273495 A1 | 11/2011 | Ward | |
| 2011/0279749 A1 | 11/2011 | Erinjippurath | |
| 2011/0292350 A1 | 12/2011 | Kasazumi | |
| 2012/0008181 A1 | 1/2012 | Cable | |
| 2012/0092624 A1 | 4/2012 | Tatsuya | |
| 2012/0105929 A1 | 5/2012 | Sung | |
| 2012/0133689 A1 | 5/2012 | Kwong | |
| 2012/0140446 A1 | 6/2012 | Seetzen | |
| 2012/0188467 A1 | 7/2012 | Escuti | |
| 2012/0188620 A1 | 7/2012 | De Echaniz | |
| 2012/0219021 A1 | 8/2012 | Lippey | |
| 2013/0050409 A1 | 2/2013 | Li | |
| 2013/0070207 A1 | 3/2013 | Korenaga | |
| 2013/0100333 A1 | 4/2013 | Awatsuji | |
| 2013/0106923 A1 | 5/2013 | Shields et al. | |
| 2013/0148037 A1 | 6/2013 | Whitehead | |
| 2013/0215730 A1 | 8/2013 | Okamoto | |
| 2013/0265554 A1 | 10/2013 | Baranec | |
| 2014/0043352 A1 | 2/2014 | Damberg et al. | |
| 2014/0268330 A1 | 9/2014 | Perkins | |
| 2014/0340286 A1 | 11/2014 | Machida | |
| 2015/0002750 A1 | 1/2015 | Toyooka | |
| 2015/0181180 A1 | 6/2015 | Guthrie | |
| 2015/0346491 A1 | 12/2015 | Christmas | |
| 2016/0077339 A1 | 3/2016 | Christmas | |
| 2016/0381329 A1 | 12/2016 | Damberg | |

FOREIGN PATENT DOCUMENTS

| | | |
|---|---|---|
| CN | 101822043 | 9/2010 |
| CN | 102749793 | 10/2012 |
| CN | 103080831 | 5/2013 |
| GB | 2485609 | 5/2012 |
| JP | H08294138 A | 11/1996 |
| JP | 2005241905 | 9/2005 |
| JP | 2006208923 | 8/2006 |
| JP | 2008544307 A | 12/2008 |
| JP | 2009539138 | 11/2009 |
| JP | 2010145431 A | 7/2010 |
| JP | 2011514546 | 5/2011 |
| JP | 2011528132 | 11/2011 |
| WO | 2005071654 | 8/2005 |
| WO | 2010125367 | 11/2010 |
| WO | 2012145200 | 10/2012 |

(56) References Cited

FOREIGN PATENT DOCUMENTS

| WO | 2013094011 A1 | 6/2013 |
| WO | 2017054342 A1 | 4/2017 |

OTHER PUBLICATIONS

I.V. Il'lina et al Gerchberg-Saxton Algorithm: Experimental Realisation and Modification for the Problem of Formation of Multimode Laser Beams, "Quantum electronics", 39 No. 6, 209, pp. 521-527.

* cited by examiner

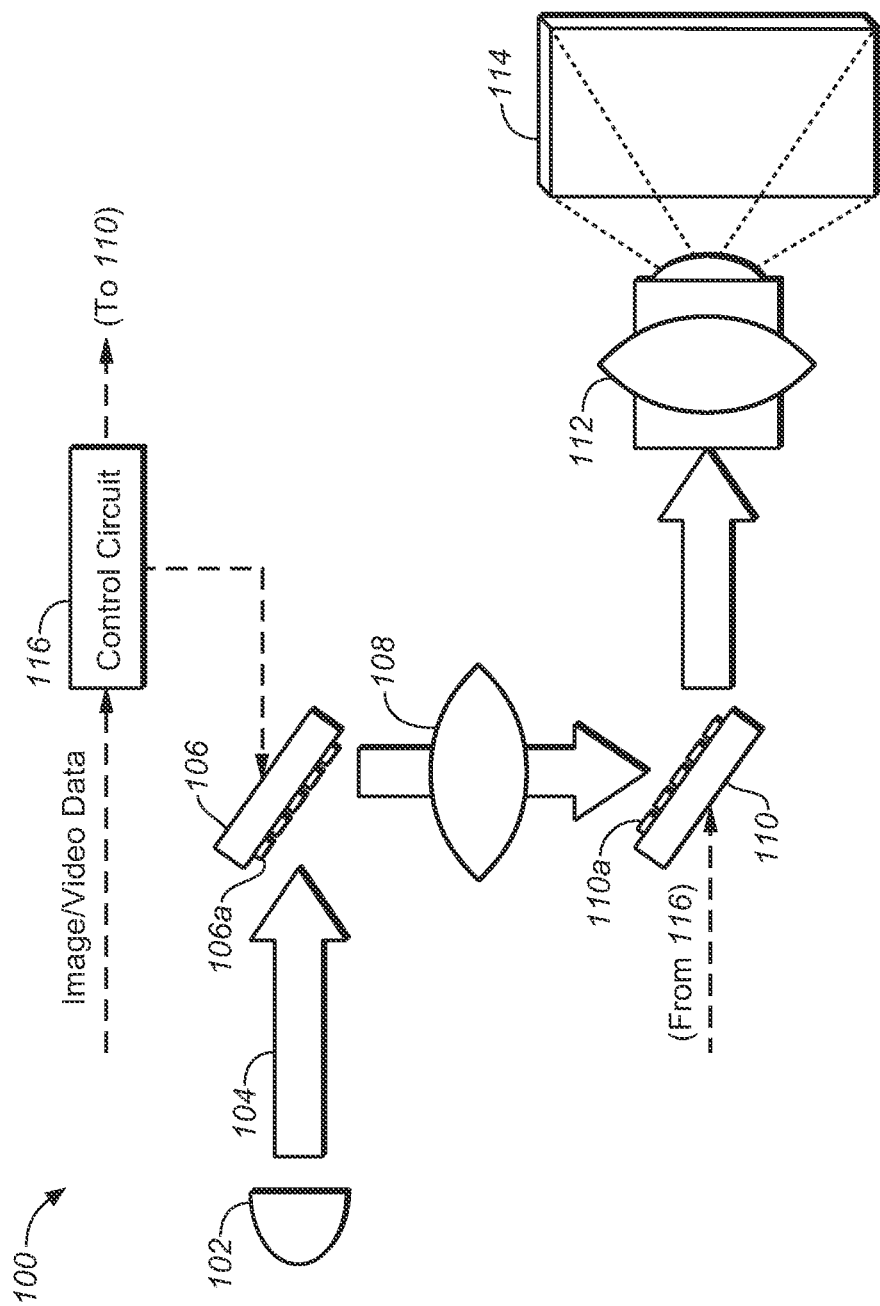

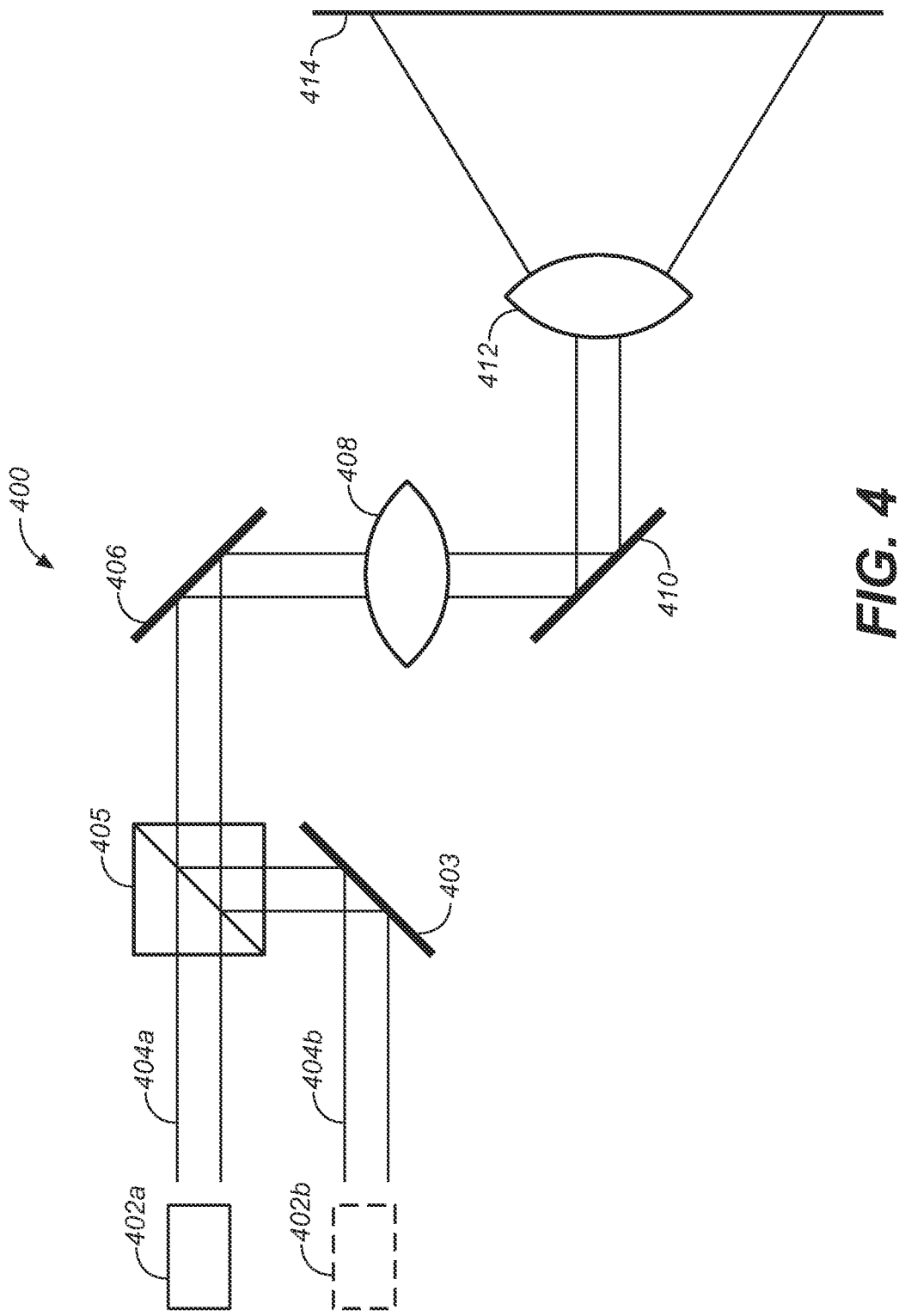

MULTIPLE STAGE MODULATION PROJECTOR DISPLAY SYSTEMS HAVING EFFICIENT LIGHT UTILIZATION

CROSS REFERENCE TO RELATED APPLICATIONS

This application is a Continuation Applications of U.S. patent application Ser. No. 16/847,147, filed Apr. 13, 2020, which is a Continuation Applications of U.S. patent application Ser. No. 15/880,239, filed Jan. 25, 2018, now patent Ser. No. 10/623,685, issued Apr. 14, 2020, which is a Continuation Applications of U.S. patent application Ser. No. 15/358,998, filed Nov. 22, 2016, now U.S. Pat. No. 9,918,052, issued on Mar. 13, 2018, which is a Continuation Applications of U.S. patent application Ser. No. 14/696,918 filed on Apr. 27, 2015, now U.S. Pat. No. 9,531,982, issued Dec. 27, 2016, which is a Continuation Applications of U.S. patent application Ser. No. 14/300,585 filed on Jun. 10, 2014, now U.S. Pat. No. 9,049,413, issued on Jun. 2, 2015, which claims the benefit of priority to U.S. Provisional Patent Application No. 61/860,203 filed on Jul. 30, 2013 entitled, "Multiple Stage Modulation Projector Display Systems Having Efficient Light Utilization" which are incorporated herein by reference in their entirety.

TECHNICAL FIELD

The present invention relates to displays systems and, more particularly, to dual or multi-stage modulation projection display systems.

BACKGROUND

In a conventional projector system, there is typically a single light source that illuminates a screen with an image that is modulated by some optical system within the projector. When there is an image to be projected that has a "highlight" (that is, a region of high brightness—e.g., a specular reflection off of a surface in the image, direct sunlight, a luminant object, one region that is substantially more luminant than other regions or the like), then the highlight would have the same luminance level as the "full" screen. In that case, the light coming through the projector would have to be fully ON for the entire screen and the projector system would have to "throw away" light that is not a part of the highlight. This may not tend to be the most-efficient use of the light source.

SUMMARY

Several embodiments of display systems and methods of their manufacture and use are herein disclosed.

Dual or multi-modulation display systems comprising a first modulator and a second modulator are disclosed. The first modulator may comprise a plurality of analog mirrors (e.g. MEMS array) and the second modulator may comprise a plurality of mirrors (e.g., DMD array). The display system may further comprise a controller that sends control signals to the first and second modulator. The display system may render highlight features within a projected image by affecting a time multiplexing scheme. In one embodiment, the first modulator may be switched on a sub-frame basis such that a desired proportion of the available light may be focused or directed onto the second modulator to form the highlight feature on a sub-frame rendering basis.

In one embodiment, a multi-modulation projector display system, said display system comprising: a light source; a controller; a first modulator, said first modulator being illuminated by said light source and said first modulator comprising a plurality of analog mirrors to modulate light from the light source; a second modulator, said second modulator being illuminated by light from said first modulator and capable of modulating light from said first modulator, and said second modulator comprising a plurality of mirrors; said controller further comprising: a processor; a memory, said memory associated with said processor and said memory further comprising processor-readable instructions, such that when said processor reads the processor-readable instructions, causes the processor to perform the following instructions: receiving image data, said image data comprising at least one highlight feature; sending control signals to said first modulator such that said first modulator may allocate a desired proportion of the light from said light source onto said second modulator to form said highlight feature; and sending control signals to said second modulator such that said desired proportion of the light from said light source is modulated to form said highlight feature.

In another embodiment, a processor-implemented method for rendering highlight features within video data stream, said video data stream being projected by a multi-modulation projection display system, said display system comprising a first modulator, said first modulator, said first modulator comprising a plurality of analog mirrors, a second modulator, said second modulator comprising a plurality of mirrors and a processor, said processor controlling said first modulator and said second modulator, the method comprising: receiving image data, said image data comprising at least one highlight feature; sending control signals to said first modulator such that said first modulator may allocate a desired proportion of the light from said light source onto said second modulator to form said highlight feature; and sending control signals to said second modulator such that said desired proportion of the light from said light source is modulated to form said highlight feature.

Other features and advantages of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIG. 1 is one embodiment of a dual modulation projector display system that may be suitable for the systems, methods and techniques of the present application disclosed herein.

FIGS. 4 and 5 depict two embodiments of a multi-modulator projector system as made in accordance with the principles of the present application.

DETAILED DESCRIPTION

Figure 2A:
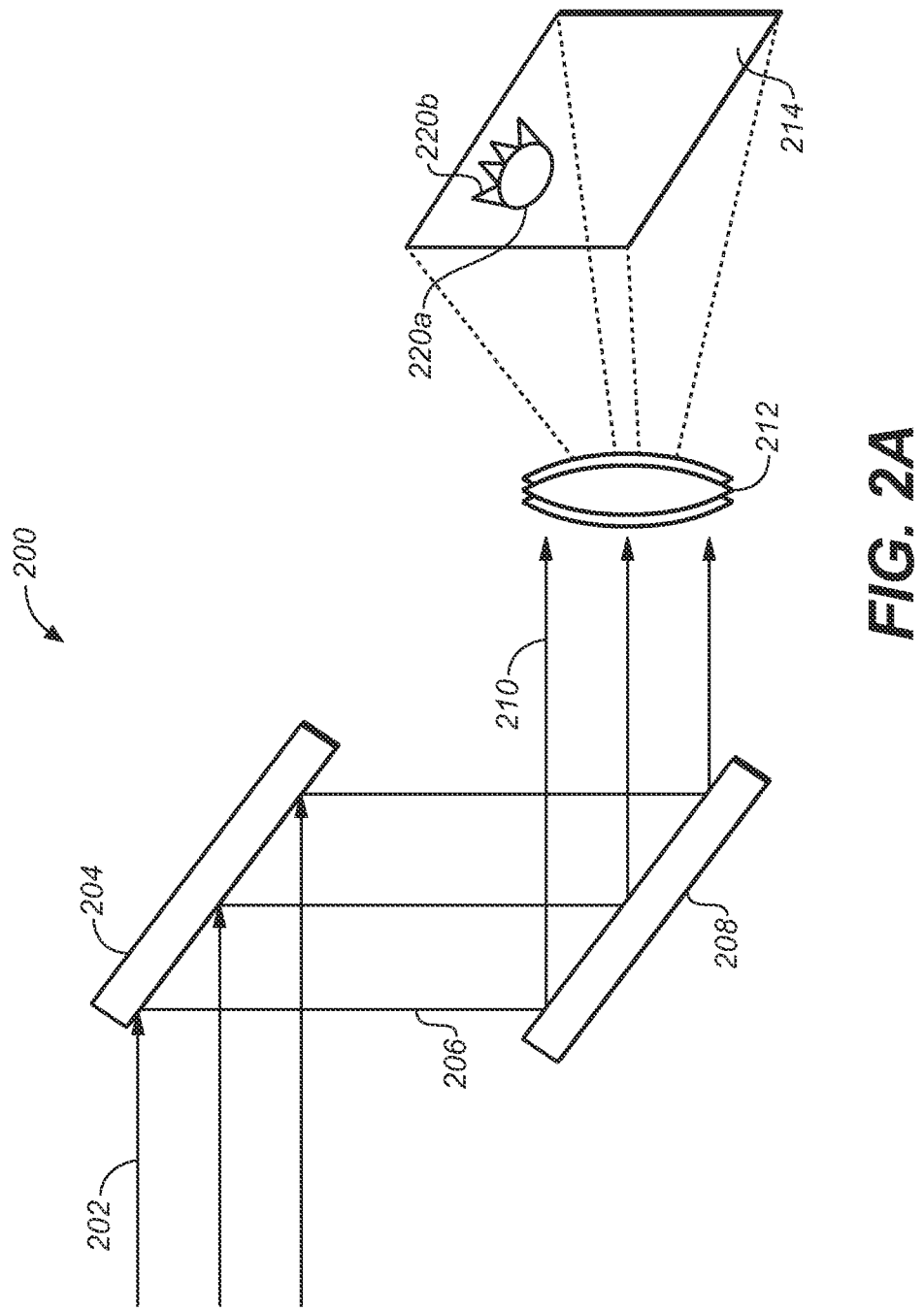
FIGS. 2A and 2B depict a high level schematic description of illuminating a highlight section within a given projected image as made in accordance with the principles of the present application.

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

As utilized herein, terms "component," "system," "interface," "controller" and the like are intended to refer to a computer-related entity, either hardware, software (e.g., in execution), and/or firmware. For example, any of these terms can be a process running on a processor, a processor, an object, an executable, a program, and/or a computer. By way of illustration, both an application running on a server and the server can be a component and/or controller. One or more components/controllers can reside within a process and a component/controller can be localized on one computer and/or distributed between two or more computers.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

INTRODUCTION

With current digital projector, the full screen and highlight luminance levels tend to be equal, but this approach also tends to be inefficient from the standpoint of light energy considerations.

In many embodiments disclosed herein, novel dual modulator, triple modulator and other multi-modulator projection display systems and techniques offer the possibility of putting additional light onto highlight features on a projected image—as opposed to throwing away excess light that is not needed. Many embodiments employ a combination of a MEMS array as a first (or early) stage modulator that projects an intermediate illumination onto a second (or later) stage DMD modulator.

In another aspect of several embodiments of the present application, a novel time division multiplexing scheme may aid the systems and architectures of the novel dual, triple and/or multi-stage modulator projector systems. If a frame of image data may be projected in a sequence of sub-frames, then highlights may be accommodated in an efficient manner, from the consideration of light energy usage. In other aspects of several embodiments, advanced bit sequence schemes are disclosed that may help to affect such time division multiplexing schemes.

Light Efficient Dual-Modulator Projector Embodiments

Dual modulation projector systems have been described in commonly-owned patents and patent applications, including:

(1) U.S. Pat. No. 8,125,702 to Ward et al., issued on Feb. 28, 2012 and entitled "SERIAL MODULATION DISPLAY HAVING BINARY LIGHT MODULATION STAGE";
(2) United States Patent Application 20130148037 to Whitehead et al., published on Jun. 13, 2013 and entitled "PROJECTION DISPLAYS"
which are hereby incorporated by reference in their entirety.

In many dual, triple, more than 2-modulation (all of which are hereinafter referred to as "multi-modulation") display systems disclosed herein use beam steering to put light on the modulation chips only where needed.

FIG. 1 is one embodiment of a dual modulating projector display system 100, comprising two or more digital projectors (as modulators). FIG. 1 shows a monochrome display 102 according to this example embodiment. Display 100 comprises a light source 102. Light 104 from light source 102 illuminates a first light modulator 106. Light source 102 may comprise, for example: a laser; a xenon lamp; an array of lasers (e.g., diodes or otherwise) or other solid-state light emitters; an arc lamp; or the like.

In one embodiment, the first light modulator 106 may comprise a plurality of controllable elements 106a—e.g., on a fast switching devices, such as a MEMS device or the like. As will be described in greater detail below (and in reference to FIGS. 2A-B and FIGS. 3A-C), elements 106a may be selected such that they may be steered to reflect light to a second modulator 110 by a suitable control circuit/controller 116. The controller 116 may comprise a processor, a memory in communication with the processor and such that the memory may comprise instructions such that the controller may suitably control first modulator and second modulator (and other modulators, if they are in the system at issue) to perform the highlighting techniques as described herein.

The set of controllable elements may also comprises a set of controllable analog mirrors—possibly with switching speeds sufficiently responsive to provide subframe rendering for processing highlights as described herein. In one embodiment, the switching response time of elements 106a may be fast enough—so as to reflect light onto the second modulator several times in a given frame of image data. For example, elements 106a may affect a half frame, third frame, a quarter frame, or 1/n frame illumination onto second modulator 110, as desired.

Light from first modulator 106 may pass through an optical system 108—which may comprise sufficient optical components to perform a desired point spread function (PSF) of illumination onto second modulator 110. Depending on the ratio of elements 106a in first modulator 106 to elements 110a in second modulator 110, the desired PSF may vary accordingly. For example, if the first modulator 106 is a MEMS array and second modulator 110 is a DMD array, a typical MEMS array has many less elements 106a (e.g., range from a few hundred to a few thousand mirror elements, 100 to 2-3K)—than a DMD array that may be a few million mirror elements thereon (e.g. over 500K mirrors and over).

Second light modulator 110 may be controlled by control circuit 116 (as first light modulator 106 may be) and comprise a plurality of controllable elements 110a. Each controllable element 110a can be controlled to select a proportion of the light that is incident on the element 110a from first spatial light modulator 106 that is transmitted to a viewing area 114 (through, possibly a second optical system 112).

In some embodiments, second spatial light modulator 110 comprises optical reflective or transmissive elements 110a that can be switched between ON and OFF states, e.g., a DMD device. In such embodiments, second spatial light modulator 110 may be controlled by a controller that sets its elements to be ON or OFF.

Transfer optics 108 carries light from first light modulator 106 to second light modulator 110. This light is capable of illuminating the entire active area of second light modulator 110 when all elements 106a of first spatial light modulator 106 are ON. This light could spread past the edges of second spatial light modulator 110. Transfer optics 108 may blur the light. Transfer optics 108 may be characterized by a transfer function which at least approximates how light issuing from a point on first spatial light modulator 106 will be spread over second spatial light modulator 110. The pattern of light incident on second light modulator 110 can be estimated or determined from the configuration of first modulator 106 (i.e. from which elements 106a are ON and which elements 106a are OFF) and the transfer function. A suitable projection lens 112 focuses light from second spatial light modulator 110 onto a screen 114 for viewing. Screen 114 may comprise a front-projection screen or a rear-projection screen.

Although the embodiment of FIG. 1 depicts a single light channel, it will be appreciated that the first and second modulators may be replicated for each of a series of color channels within the projector such that each color channel includes 2 optically offset reflective modulators. The series of color channels may comprise a red channel, a green channel, and a blue channel. The light source may comprise, for example, a plurality of colored laser light sources. In one embodiment, the light sources may be modulated either globally (in brightness) and/or spatially (locally) dimmed according to signals (not shown) from a controller (e.g., 116).

The intermediate signals to the second modulator may be, for example, based on a light field simulation comprising a point spread function of light reflected by the first modulator and the offset. For example, the intermediate signals to the second modulator may be based on a point spread function of light reflected by the first modulator in each channel and the offset in each channel. The offset in the channels may be the same, or the offset of at least two channels is different and the intermediate signals to second modulator in each channel is based on at least one of the offset and differences in offset between channels.

Light Efficient Operation Embodiments

Figure 2B:
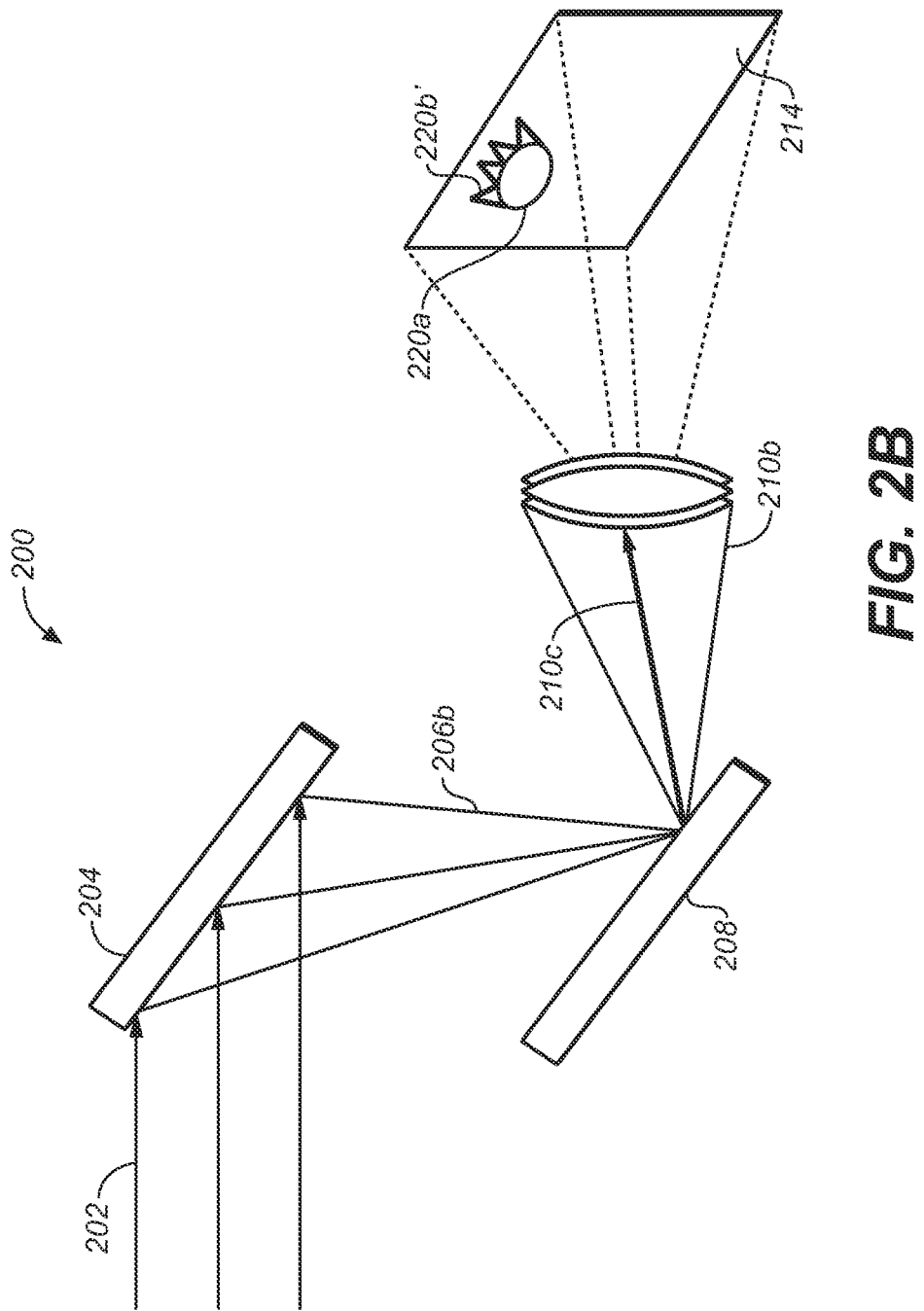

In one embodiment of the present application, the dual modulation projector system of FIG. 1 may be employed to affect an efficient light usage. FIGS. 2A through 2C depict one embodiment in which the dual modulation system of FIG. 1 may be capable of providing illumination of highlights within an image in an efficient manner from the standpoint of light energy.

FIG. 2A depicts merely a portion 200 of the display system 100. Main light beam 202 illuminates the first modulator 204—which may be any suitably fast switching device, such as a MEMS device or some set of fast switching reflective and/or transmissive elements. As may be seen, first modulator 204 is able to steer light beam 202 onto the elements of the second modulator 208.

The illumination, in FIG. 2A, would be sufficient to illuminate a substantially full image on a projection screen 214—passed, possibly, through sufficient projector optics 212. As may also be seen, an image of a crown—which may comprise a lower portion 220a and an upper portion 220b—is shown on the projector screen. In this example, suppose that the top portion of the crown is to be displayed as a highlight (i.e., at substantially full illumination of the display system). Suppose further that the lower portion of the crown is not to be displayed at full illumination—thus, further highlighting the top portion of the crown.

As is known, one approach to obtaining bright high contrast images (e.g., with highlights) using such a dual modulation projector may be to have the full screen and highlight luminance levels are equal—and provide the necessary modulation via, e.g., a pulse width modulation. However, this approach may not be the most efficient—as typically pulse width modulation employs a constant light for the entire frame period. Thus, the modulators need to throw away a certain amount of light energy during the frame period.

FIG. 2B depicts one embodiment of the present application may supply such a highlight to portion 220b—without undue waste of the light energy. As may be seen, the active elements of first modulator 204 may be switched for a first time period (possibly, for less than a full frame)—such that more light energy is focused onto a portion of the second modulator that directly forms the portion of the highlight 220b'. For this first period of time, more of a relative amount of light from the main beam 202 illuminates the highlight.

Figure 3A:
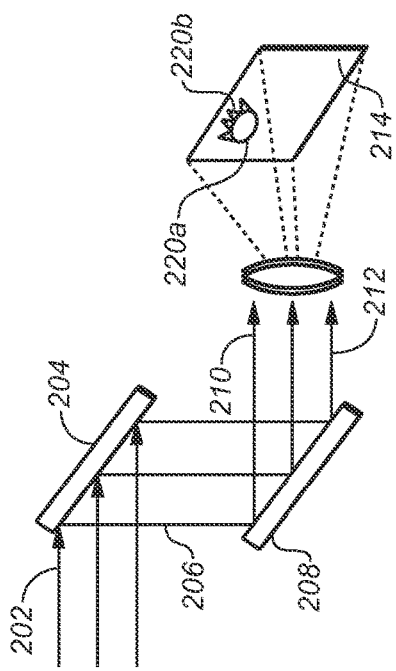
FIGS. 3A, 3B and 3C depict one embodiment of a time division multiplexing scheme as made in accordance with the principles of the present application.
Figure 3B:
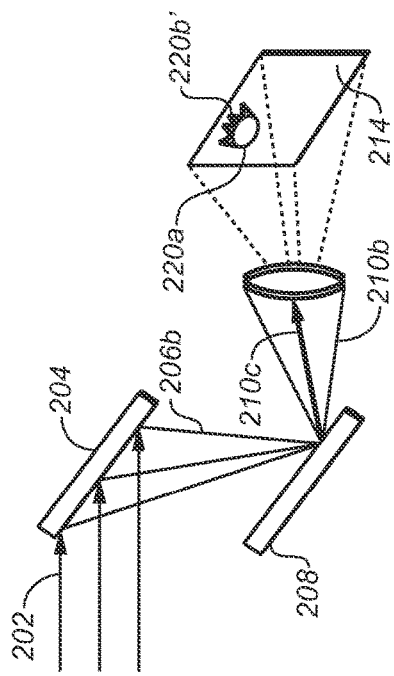
Figure 3C:
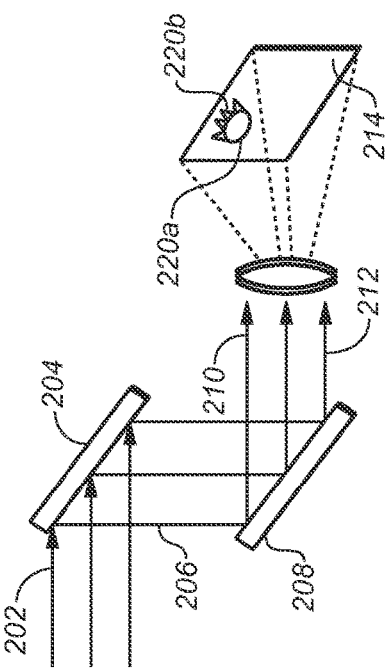

FIGS. 3A through 3C depict the sequence of illumination over the course of three time periods. FIGS. 3A and 3B show the same image illumination of FIGS. 2A and 2B, respectively, over a first and second time period (T1 and T2). In a third period of time, T3, FIG. 3C may show the same image as in FIG. 3A.

This exemplary set of figures (FIGS. 3A through 3C) demonstrate a scheme—similar to time division multiplexing—in which a portion of an image may be highlighted, without throwing away excess light energy. In fact, the amount of highlight may depend on a number of factors—such as the relative of amount of time the system spends highlighting versus the amount of time spent illuminated the remainder of the image.

Figure 3D:
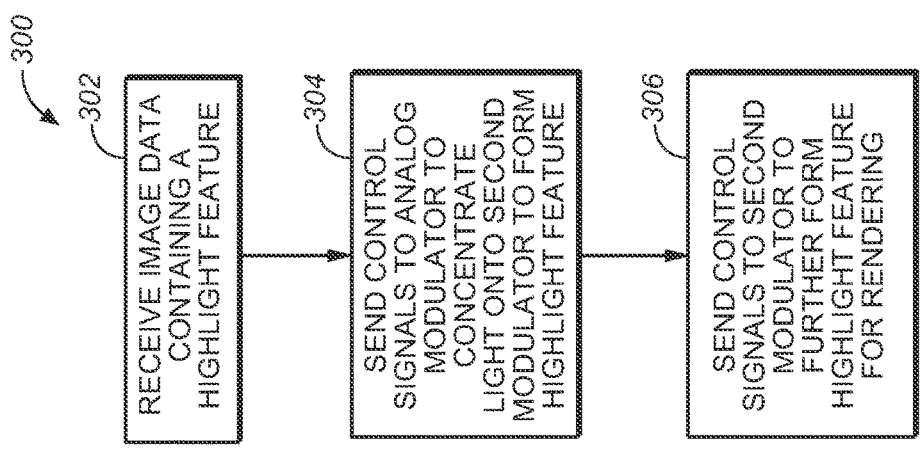
FIG. 3D is one embodiment of a control method for affecting the rendering of highlight features within a projected image by a multi-modulator display system.

FIG. 3D depicts one embodiment of a control method 300 for forming and/or rendering a highlight feature which may comprise a portion of an image frame and/or video data. At 302, the controller may receive image/video data comprising a portion of the image/video data that is a feature to be highlighted within an image frame(s) or a portion of the video data. At 304, the controller may send control signals to the analog modulator (which may be the first modulator layer/stage or other modulator layer/stage). These control signals may induce the analog mirrored elements to focus, or otherwise project, a good portion of the light from the light source onto second, or other, modulator layer/stage.

The amount of light focused by the analog modulator may vary according to the image to be rendered. In some cases, the controller may direct that all of the available light is to be focused and/or modulated in order to render the highlight. In other cases, the amount of light devoted to the highlight may be substantially less than 100% of the available light. In yet other cases, there may be a desired portion of the available light devoted to one or many highlights and some portion of the light devoted to other parts/portions of the image/video data that may not be highlighted. It may suffice for purposes of the present application that the projector system be able to dynamically allocate a desired amount and/or proportion of the available light in order to render/project highlight features.

The controller may send control signals to the second/other modulator to further modulate the light, so that the rendered and/or projected image is sending a good portion of the light energy to the highlighted portion of the image and/or video data.

As is discussed, this focusing and/or projecting from the analog mirrors may be for a brief period of time—e.g., in a sub-frame of image rendering and/or in some time multiplexed fashion. In this manner, the highlighted portion may receive a good portion of the light energy so that the highlighted portion is visibly highlighted by intended viewers of the image/video data.

As mentioned above, the previous manner to show portion 220b as a highlight might have been to have a constant light source outputting at its peak luminance—and focus the full luminance on the highlight, while throwing away excess light that is not needed or desired on other parts of the image. This, however, tends to waste the light energy of the display system.

Embodiments Comprising MEMS Arrays

Conceptually, this time division multiplexing scheme may tend to work well—as only a small percentage of the light energy is required for the highlights. However, in the case in which the first (or early stage) modulator is a MEMS array, then it may be the case that there are currently no commercially available beam-steering MEMS devices with nearly enough mirrors (or at least at an affordable price). In order to illuminate small highlights in a given image, the optimal number may approach over 1500 mirrors. However, the largest current devices may tend to have on the order of approximately 100 mirrors to a few hundred mirrors.

To compensate for the desirability for additional mirrors for proper highlighting, several embodiments of the present application may affect a new scheme for projecting images (e.g., in particular, images comprising highlights). For example, several embodiments employ a form of time division multiplexing during a frame period to modulate the light. As noted above, DMDs typically employ a form of pulse width modulation—thus, the light from the light source is usually required to be constant during the entire frame period. As will be discussed further herein, with time division multiplexing, the projector system may produce a non-constant illumination.

Thus, several embodiments of the present application may steer the light beam on the modulators (e.g., modulation chips such as MEMS, analog DMD devices and/or digital DMD devices)—only where and/or when needed. In the example of FIGS. 3A through 3C, it was seen that a time division multiplexing scheme may split a frame period into a number of sub-frames. In that example, it was depicted as three subframes T1, T2 and T3; however, it will be appreciated that other frame subdivisions may be possible and the scope of the present application encompasses other subframe subdivision schemes. As will be discussed further herein, several embodiments may employ a different number of subframes—e.g., 2, 4 or 16 subframes.

Multi-Modulation Projector Embodiments

While some embodiments of the present application may comprise a dual modulator system, other systems having triple (or more) modulators may also suffice for purposes of the present application.

FIG. 4 is one multi-modulator system 400 comprising a light source 402a, illuminating a first light beam 404a to a beamsplitter 405. To provide the highlight, a second light beam 404b may illuminate a first modulator 403. First modulator 403 may be a MEMS array or some other suitable faster switching set of elements. To create the second light beam 404b, there may be an optional, additional light source 402b— or a part of the first light beam 404a may be split out to form second light beam 404b in any manner known in the art.

Beamsplitter 405 may serve to combine the first and the second light beams to illuminate a second modulator 406. Second modulator 406 may comprise either a MEMS array or a DMD device or any other suitable modulator. Second modulator 406 may illuminate a third modulator 410 (via, possibly, an intermediate optical system 408. Optical system 408 may provide sufficient blurring or other condition of the illumination—such that the convolution of the light from the second modulator to third modulator is sufficient to project a suitable image onto projector screen 414 (via, possibly, a projector optical system 412).

Figure 5:
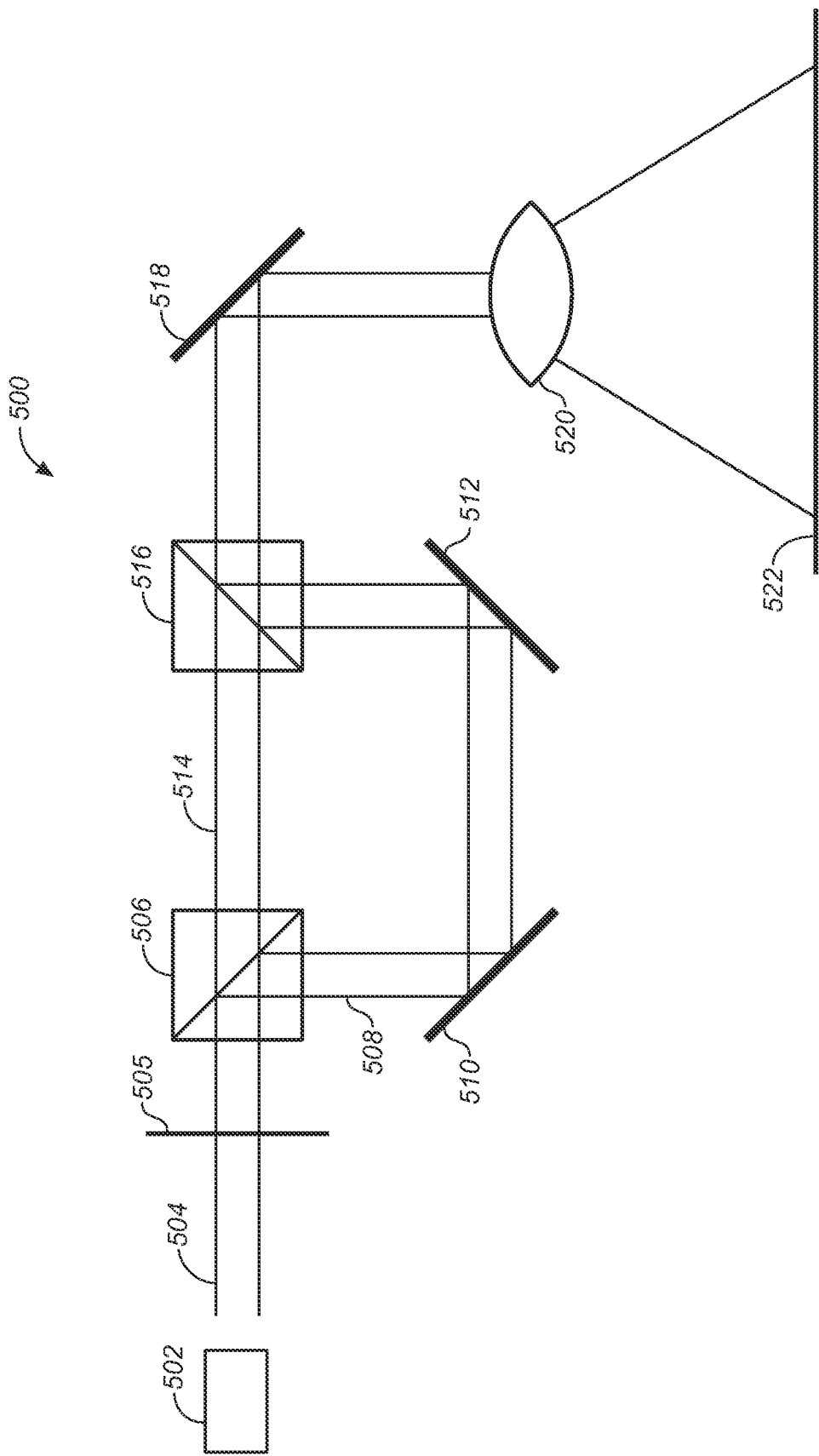

FIG. 5 depicts yet another possible multi-modulator display system 500 that may be suitable for the purposes of the present application. Light source 502 may illuminate a first light beam 504. Polarizer 505 may apply a desired polarization to light beam 504. Light beam 504 may be split by a polarizing beamsplitter 506 and create a second light beam 508. Second light beam 508 may illuminate a first modulator 510—which may comprise a MEMS array or some other fast switching elements. Light from first modulator 510 may illuminate a second modulator 512—which may comprise a MEMS array or DMD device or any other suitable modulator. The light from the third modulator may be combined with beam 514 at beamsplitter/combiner 516. Thereafter, the resulting light may illuminate a third modulator 518—which may illuminate a projection screen 522 (via, possibly, projection optical system 520).

Time Division Multiplexing/Bit Sequence Embodiments

Normally, a typical DMD employs a single bit sequence per frame to obtain a certain bit per pixel (e.g., 16 bit/pixel) modulation. In many embodiments, the bit sequence may be modified such that the higher order bits are spread across the frame period, therefore, they may be repeated multiple times. For example, in one embodiment, the top bits (e.g., the top 12 bits of 16 bits) may be repeated for each subframe. This would allow a pattern with the top 12 bits to repeat—e.g., 16 times (in a 1/16 subframe subdivision embodiment). The lower significant bits would remain unaffected—e.g., spread across the entire frame period.

In one embodiment, it may be possible to have the beam steering device (e.g., mirrors or other elements)—e.g., the first modulator—switch quickly and/or at a desired rate (e.g., 10-100 microseconds). This may be desirable—so as that the first modulator may switch in a "dark" time between sequence repeats. During such a dark time, the display system may not be outputting any light to be rendered and/or projected. This may help to avoid noticeable and/or undesirable visual effects.

Figure 6:
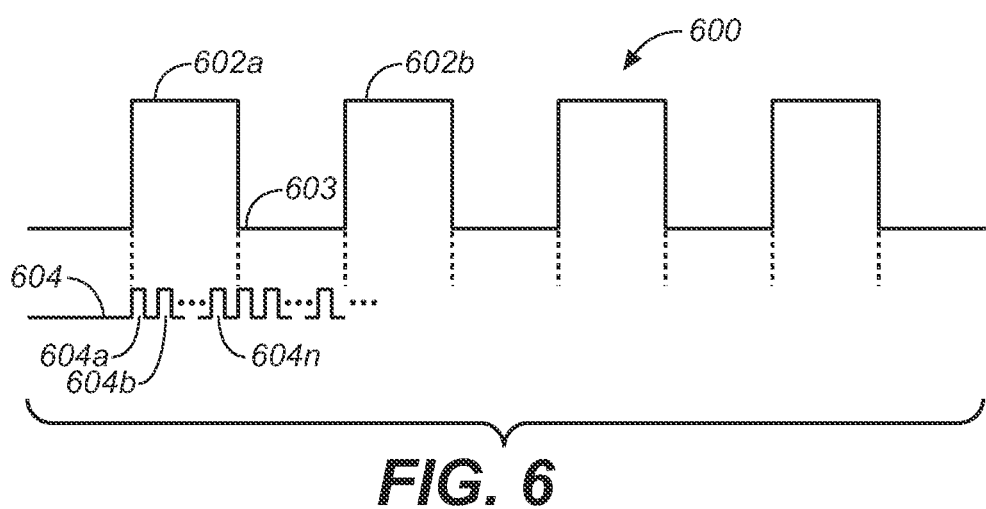
FIG. 6 depicts one high-level diagram of switching scheme that matches the bit-sequence repeating pattern.

In the case where the first modulator and/or beam steering device with a lesser number of elements (e.g., 200 elements) would need to be able to address a greater number (e.g., 3200 or more) locations. FIG. 6 depicts a high level switching scheme 600 that matches the bit-sequence repeating pattern. Pattern 602 depicts the time periods (e.g., 602a and 602b) during which the bit sequence is repeating. Between this time periods is a period of dark time (603) between sequence repeats. As may be seen in pattern 604, the first modulator is able to switch multiple times (e.g., 604a, 604b, . . . , 604n) during the entire period and the dark time.

A detailed description of one or more embodiments of the invention, read along with accompanying figures, that illustrate the principles of the invention has now been given. It is to be appreciated that the invention is described in connection with such embodiments, but the invention is not limited to any embodiment. The scope of the invention is limited only by the claims and the invention encompasses numerous alternatives, modifications and equivalents. Numerous specific details have been set forth in this description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The invention claimed is:

1. A multi-modulation projector display system, the display system comprising:
    a light source configured to project light;
    a first modulator configured to be illuminated by the light source, the first modulator comprising a first plurality of mirrors configured to modulate light from the light source;
    a second modulator configured to be illuminated by light from the first modulator, the second modulator comprising a second plurality of mirrors configured to modulate light from the first modulator; and
    a controller comprising a processor and a memory, the controller configured to:
        receive image data, the image data comprising at least one highlight feature and an image to be rendered, the highlight feature representing a subset of the area of the image to be rendered;
        provide control signals to the first modulator such that a subset of the first plurality of mirrors of the first modulator allocates a desired proportion of the light from the light source during a desired sub-frame period of light onto the second modulator to form the highlight feature; and
        provide control signals to the second modulator such that the subset of the area of the image represented by the highlight feature is modulated by a subset of the second plurality of mirrors to form the highlight feature,
    wherein an area of the subset of the second plurality of mirrors is less than an area of the subset of the first plurality of mirrors, and
    wherein the highlight feature is rendered during the desired sub-frame period using a time-multiplexing scheme.

2. The display system of claim 1, wherein the light source comprises one of a group, said group comprising: a xenon lamp, an arc lamp, a laser, an array of lasers, an array of solid-state light emitters.

3. The display system of claim 2, wherein the light source comprising an array of lasers and wherein the lasers are modulated globally and locally.

4. The display system of claim 1, wherein the first plurality of mirrors comprises one of a group consisting of a MEMS array and a set of controllable analog mirrors.

5. The display system of claim 4, wherein the second plurality of mirrors comprises one of a group consisting of a MEMS array, a DMD array, a set of controllable analog mirrors, and a set of controllable digital mirrors.

6. The display system of claim 1, wherein a number of the first plurality of mirrors is less than a number of the second plurality of mirrors.

7. The display system of claim 1, wherein light from the first modulator performs a desired point spread function upon the second modulator.

8. The display system of claim 1, wherein the display system further comprises:
    transfer optics disposed between the first modulator and the second modulator.

9. The display system of claim 1, further comprising a second optical system configured to focus a projection light from the second modulator onto a screen.

10. The display system of claim 1, wherein, when using the time-multiplexing scheme, the controller is configured to:
    allocate a dark period within a first sub-frame period, wherein the light source does not output light during the dark period; and
    switch the first modulator during the dark period.

11. A processor-implemented method for rendering highlight features within a video data stream, the video data stream being projected by a multi-modulation projection display system, the display system comprising a light source, a first modulator, a second modulator, and a processor, the first modulator comprising a first plurality of mirrors, the second modulator comprising a second plurality of mirrors, the processor controlling the first modulator and the second modulator, the method comprising:
    receiving image data, the image data comprising at least one highlight feature and an image to be rendered, the highlight feature representing a subset of the area of the image to be rendered;
    providing control signals to the first modulator such that a subset of the first plurality of mirrors of the first modulator allocates a desired proportion of the light from the light source during a desired sub-frame period of light onto the second modulator to form the highlight feature; and
    providing control signals to the second modulator such that the subset of the area of the image represented by the highlight feature is modulated by a subset of the second plurality of mirrors to form the highlight feature,
    wherein an area of the subset of the second plurality of mirrors is less than an area of the subset of the first plurality of mirrors, and
    wherein the highlight feature is rendered during the desired sub-frame period using a time-multiplexing scheme.

12. The method of claim 11, wherein providing control signals to the first modulator includes providing control signals to allocate a desired portion of the light for a first period of time.

13. The method of claim 12, wherein the first period of time is less than one frame period.

14. The method of claim 11, further comprising:
    allocating a dark period within a first sub-frame period, wherein the light source does not output light during the dark period; and
    switching the first modulator during the dark period.

15. The method of claim 11, further comprising transferring a modulated light from the first modulator to the second modulator.

16. The method of claim 15, wherein transferring the modulated light includes performing a predetermined point spread function of illumination onto the second modulator.

17. A non-transitory computer-readable medium storing instructions that, when executed by a control circuit of a projector display system comprising a light source, a first modulator including a first plurality of mirrors, and a second modulator including a second plurality of mirrors, cause the projector display system to perform operations comprising:
receiving image data, the image data comprising at least one highlight feature and an image to be rendered, the highlight feature representing a subset of the area of the image to be rendered;
providing control signals to the first modulator such that a subset of the first plurality of mirrors of the first modulator allocates a desired proportion of the light from the light source during a desired sub-frame period of light onto the second modulator to form the highlight feature; and
providing control signals to the second modulator such that the subset of the area of the image represented by the highlight feature is modulated by a subset of the second plurality of mirrors to form the highlight feature,
wherein an area of the subset of the second plurality of mirrors is less than an area of the subset of the first plurality of mirrors, and
wherein the highlight feature is rendered during the desired sub-frame period using a time-multiplexing scheme.

18. The non-transitory computer-readable medium of claim 17, the operations further comprising transferring a modulated light from the first modulator to the second modulator.

19. The non-transitory computer-readable medium of claim 18, wherein transferring the modulated light includes performing a predetermined point spread function of illumination onto the second modulator.

20. The non-transitory computer-readable medium according to claim 17, the operations further comprising focusing a projection light from the second modulator onto a screen.

* * * * *